United States Patent
Carlson

(10) Patent No.: US 11,709,380 B2
(45) Date of Patent: *Jul. 25, 2023

(54) DIFFUSERS IN WEARABLE DEVICES

(71) Applicant: Snap Inc., Santa Monica, CA (US)

(72) Inventor: Cècile Claire Madeleine Carlson, Boulder, CO (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,292

(22) Filed: Feb. 18, 2022

(65) Prior Publication Data

US 2022/0171220 A1 Jun. 2, 2022

Related U.S. Application Data

(63) Continuation of application No. 16/988,840, filed on Aug. 10, 2020, now Pat. No. 11,287,675, which is a continuation of application No. 16/446,704, filed on Jun. 20, 2019, now Pat. No. 10,768,451.

(60) Provisional application No. 62/690,003, filed on Jun. 26, 2018.

(51) Int. Cl.
| | |
|---|---|
| *G02C 11/00* | (2006.01) |
| *F21V 3/04* | (2018.01) |
| *F21V 23/00* | (2015.01) |
| *G02B 5/02* | (2006.01) |
| *F21W 111/00* | (2006.01) |
| *F21Y 103/33* | (2016.01) |
| *F21Y 115/10* | (2016.01) |

(52) U.S. Cl.
CPC ............. *G02C 11/10* (2013.01); *F21V 3/049* (2013.01); *F21V 23/003* (2013.01); *G02B 5/0257* (2013.01); *F21W 2111/00* (2013.01); *F21Y 2103/33* (2016.08); *F21Y 2115/10* (2016.08)

(58) Field of Classification Search
CPC ........ G02C 11/10; G02C 11/04; G02B 5/025; G02B 5/0257; F21V 3/049; F21V 23/003; F21V 23/0442; F21V 33/0004; F21W 2111/00; F21W 2131/30; F21Y 2103/33; F21Y 2115/10
See application file for complete search history.

(56) References Cited

U.S. PATENT DOCUMENTS

| | | |
|---|---|---|
| 8,545,012 B2 | 10/2013 | Waters |
| 9,488,762 B2 | 11/2016 | Sasaki et al. |
| 9,720,260 B2 | 8/2017 | Calilung et al. |
| 9,753,312 B2 | 9/2017 | Moore et al. |
| 10,977,815 B1 * | 4/2021 | Chao ................. G06F 3/013 |
| 11,073,903 B1 * | 7/2021 | Ouderkirk ......... G02B 27/0093 |
| 11,287,675 B1 * | 3/2022 | Carlson .............. F21V 3/049 |

(Continued)

FOREIGN PATENT DOCUMENTS

EP 2886041 * 6/2015

*Primary Examiner* — Peggy A Neils
(74) *Attorney, Agent, or Firm* — Culhane Meadows PLLC; Stephen J. Weed

(57) ABSTRACT

Eyewear including an optical element, a controller, a support structure configured to support the optical element and the controller, light sources coupled to the controller and supported by the support structure, and a diffuser positioned adjacent to the light sources and supported by the support structure, the diffuser including microstructures that diffuse light emitted by the light sources in a radial anisotropic diffusion pattern or a prism-like diffusion pattern.

20 Claims, 9 Drawing Sheets

(56) References Cited

U.S. PATENT DOCUMENTS

| | | | |
|---|---|---|---|
| 11,493,786 B1 * | 11/2022 | Tham | ............... G02C 11/10 |
| 2003/0086053 A1 | 5/2003 | Waters | |
| 2003/0189824 A1 | 10/2003 | Meeder et al. | |
| 2008/0186738 A1 | 8/2008 | Kim et al. | |
| 2012/0215291 A1 | 8/2012 | Pugh et al. | |
| 2012/0287633 A1 | 11/2012 | Kelly et al. | |
| 2016/0170119 A1 | 6/2016 | Hao et al. | |
| 2019/0004325 A1 | 1/2019 | Connor | |
| 2019/0068873 A1 | 2/2019 | Rodriguez, Ii et al. | |
| 2019/0331936 A1 | 10/2019 | Allen | |
| 2019/0353931 A1 | 11/2019 | Krenesky | |
| 2020/0393897 A1 | 12/2020 | Ljunggren et al. | |
| 2021/0157133 A1 | 5/2021 | Bougrenet et al. | |

* cited by examiner

LEDs Behind a Transmission Mask

DIFFUSERS IN WEARABLE DEVICES

CROSS-REFERENCE TO RELATED APPLICATIONS

This application is a Continuation of U.S. patent application Ser. No. 16/988,840 filed on Aug. 10, 2020, which is a Continuation of U.S. patent application Ser. No. 16/446,704 filed on Jun. 20, 2019, which claims priority to U.S. Provisional Application Ser. No. 62/690,003 filed on Jun. 26, 2018, the contents of all of which are incorporated fully herein by reference.

FIELD

The subject matter disclosed herein generally relates to eyewear and, more particularly, to eyewear having diffusers to achieve a desired visual effect.

BACKGROUND

A large portion of the world's population wears eyewear. Eyewear may include prescription glasses, sunglasses and smart glasses among others. Lighting may be beneficial for both the functionality and the aesthetics of eyewear. Lighting alone, however, may not achieve the desired functionality and aesthetics.

DETAILED DESCRIPTION

Figure 1A:
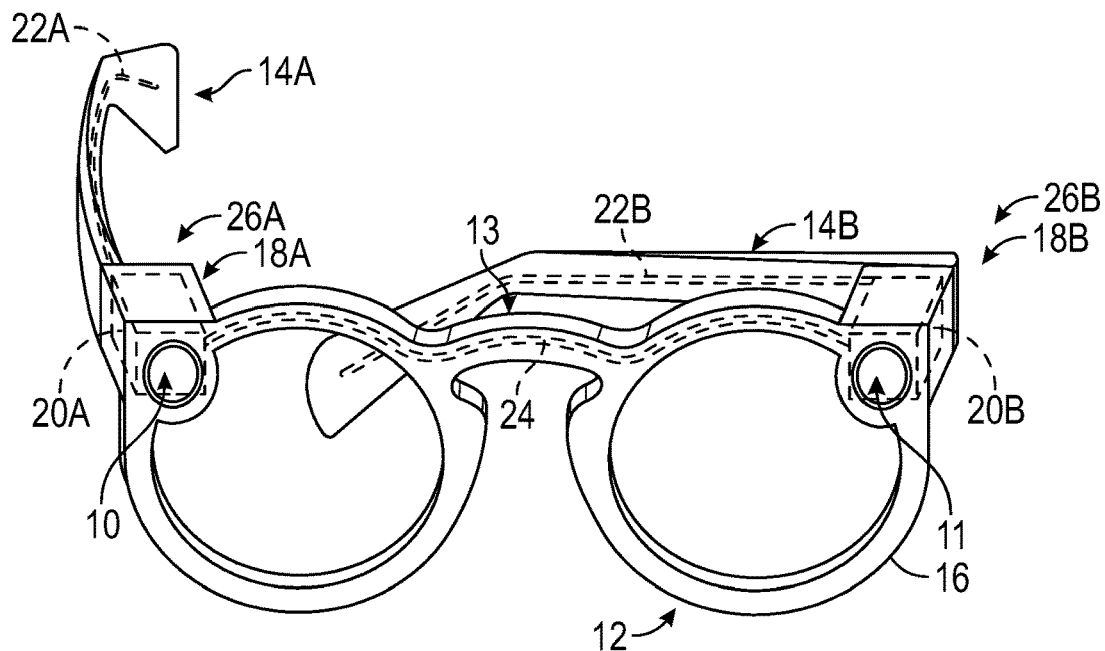
FIG. 1A is a perspective view of an eyewear example including electronic components and a support structure supporting the electronic components.

In the following detailed description, numerous specific details are set forth by way of examples in order to provide a thorough understanding of the relevant teachings. However, it should be apparent to those skilled in the art that such details are not necessary to practice the present teachings. In other instances, a relatively high-level description, without detail, of well-known methods, procedures, components, and circuitry avoids unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The orientations of the eyewear, associated components, and any devices incorporating an LED such as shown in any of the drawings, are by way of example only, for illustration and discussion purposes. In operation, orientation of the eyewear may be in other directions suitable to the particular application of the eyewear, for example up, down, sideways, or any other orientation. Also, any directional term, such as front, rear, inwards, outwards, towards, left, right, lateral, longitudinal, up, down, upper, lower, top, bottom and side, is exemplary, and not limiting, as to direction or orientation.

Example eyewear has an optical element, electronic components, a support structure configured to support the optical element and the electronic components, and light-emitting diodes (LEDs) coupled to the electronic components and supported by the support structure. The LEDs position and orientation illuminates the support structure according to a desired visual effect.

Example methods for illuminating eyewear according to a desired visual effect include detecting, by electronic components in a support structure of the eyewear, a trigger signal instructing the electronic components to illuminate LEDs in the support structure. In response to receiving the trigger, illuminating, by the electronic components, the LEDs in the support structure according to a desired visual effect.

In one example, lighting in accordance with the examples herein enables the eyewear to indicate functionality to the user and/or to bystanders in a unique way. This functionality may include, but is not limited to, indicating to the user and/or bystanders that the eyewear is capturing an image or capturing video (i.e., the lighting synchronizes with the camera operation). In another example, lighting enables the eyewear to display a lighting pattern that is aesthetically pleasing to the user and/or the bystanders. In this example, users can customize a lighting pattern by selecting colors, flashing patterns, etc. The benefits of lighting are therefore both functionally and aesthetically desirable to eyewear users. As used herein, the term "eyewear" refers to any smart optical device having a support structure worn by a user including but not limited to smart glasses, smart goggles, and display screens.

FIG. 1A depicts a front perspective view of example eyewear 12. The illustrated eyewear 12 includes a support structure 13 that has temples 14A and 14B and a frame 16. Eyewear 12 additionally include articulated joints 18A and 18B, electronic components 20A and 20B, and core wires 22A, 22B and 24.

Support structure 13 supports one or more optical elements within a field of view of a user when worn by the user. For example, frame 16 supports the one or more optical elements. As used herein, the term "optical elements" refers to lenses, transparent pieces of glass or plastic, projectors, screens, displays and other devices for presenting visual images or through which a user perceives visual images. In an embodiment, respective temples 14A and 14B connect to frame 16 at respective articulated joints 18A and 18B. The illustrated temples 14A and 14B are elongate members having core wires 22A and 22B extending longitudinally therein.

Temple 14A is illustrated in a wearable condition and temple 14B is illustrated in a collapsed condition in FIG. 1A. As shown in FIG. 1A, articulated joint 18A connects temple 14A to a right end portion 26A of frame 16. Similarly, articulated joint 18B connects temple 14B to a left end portion 26B of frame 16. The right end portion 26A of frame 16 includes a housing that carries electronic components 20A therein, and left end portion 26B includes a housing that carries electronic components 20B therein.

A plastics material or other material embeds core wire 22A, which extends longitudinally from adjacent articulated joint 18A toward a second longitudinal end of temple 14A. Similarly, the plastics material or other material also embeds core wire 22B, which extends longitudinally from adjacent articulated joint 18B toward a second longitudinal end of temple 14B. The plastics material or other material additionally embeds core wire 24, which extends from the right end portion 26A (terminating adjacent electronic components 20A) to left end portion 26B (terminating adjacent electronic components 20B).

Support structure 13 carries electronic components 20A and 20B (e.g., by either or both of temple(s) 14A, 14B and/or frame 16). Electronic components 20A and 20B include a power source, power and communication related circuitry, communication devices, display devices, a computer, a memory, modules, and/or the like (not shown). Electronic components 20A and 20B may also include a camera/microphone 10 for capturing images and/or videos, and indicator LEDs 11 (described in more detail in other figures) indicating the operational state of eyewear 12 to any observers in proximity to the user wearing the eyewear (e.g., LEDs 11 illuminate to let observers know they are being recorded).

In one example, temples 14A and 14B and frame 16 are constructed of a plastics material, cellulosic plastic (e.g., cellulosic acetate), an eco-plastic material, a thermoplastic material, or the like, with core wires 22A, 22B and 24 embedded therein. Core wires 22A, 22B and 24 provide structural integrity to support structure 13 (i.e., temple(s) 14A, 14B and/or frame 16). Additionally, core wires 22A, 22B and/or 24 act as a heat sink to transfer heat generated by electronic components 20A and 20B away therefrom so as to reduce the likelihood of localized heating adjacent electronic components 20A and 20B. As such, core wires 22A, 22B and/or 24 thermally couple to the heat source to provide a heat sink for the heat source. Core wires 22A and 22B and/or 24 include relatively flexible conductive metal or metal alloy material such as one or more of an aluminum, an alloy of aluminum, alloys of nickel-silver, and a stainless steel, for example.

Figure 1B:
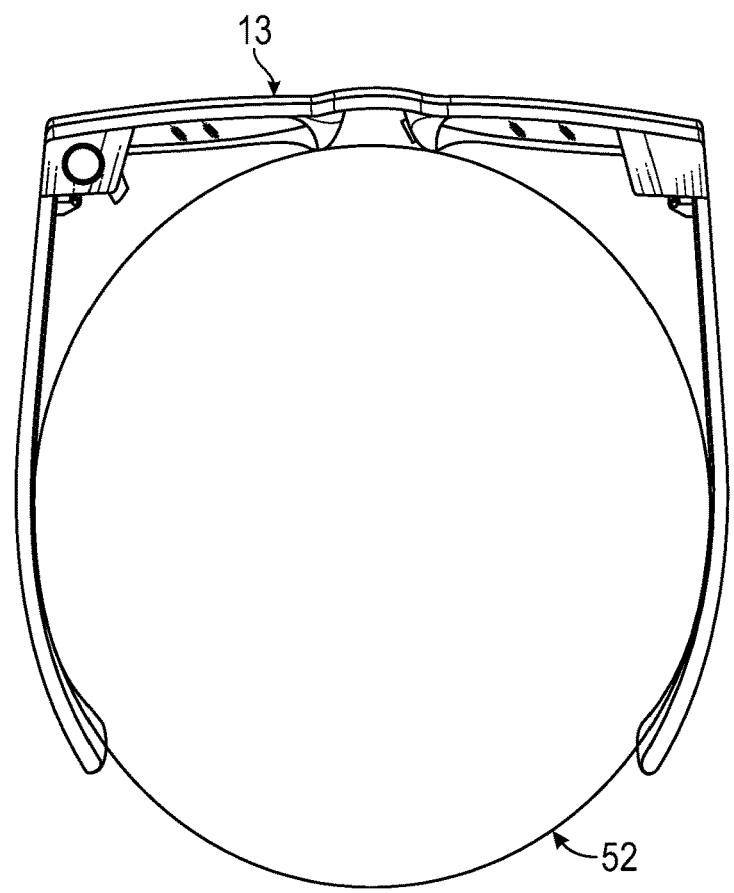
FIG. 1B is a top view of the eyewear example of FIG. 1A illustrating a region defined by the eyewear for receiving a head of a user wearing the eyewear.

Support structure 13 defines a region (e.g., region 52 (FIG. 1B) defined by frame 12 and temples 14A and 14B) for receiving a portion 52 (e.g., the main portion) of the head of the user. The defined region(s) are one or more regions containing at least a portion of the head of a user that are encompassed by, surrounded by, adjacent, and/or near the support structure when the user is wearing eyewear 12. Eyewear 12 may also include light emitting diodes (LEDs) (not shown) for illuminating support structure 13 and internal circuit boards for coupling to the electronic components and LEDs.

In addition, eyewear 12 may include other LED indicators (not shown) installed at one or more locations throughout frame 16 and/or temples 14A and 14B. For example, an LED indicator may be near the housing of electronics 20B to project information to the eye of the user. These LED indicators may be electrically coupled to electronics 20A and/or 20B (e.g., through one or more flexible printed circuit boards (FPCBs)).

FPCBs (not shown), are routed through various portions of frame 16 and temples 14A and 14B to electrically couple these electronics 20A and 20B to the LED indicators. The positions of the LED indicators provide a way to convey information to observers as well as the user wearing the eyewear.

FPCBs include one or more electrical traces (not shown) for routing electrical signals between the electronic components and the LEDs. A molding process may embed these FPCBs into the frame and temples of eyewear 12 during manufacturing. For example, during a first shot of a two-shot molding process, an injection-molding device injects plastic into a mold to form the front half of frame 16 and/or temple 14A. After forming the front halves, a robotic device may insert and position the FPCBs and other electronic components (e.g., the LEDs) within the mold at locations with respect to the front halves. During a second shot of the two-shot molding process, the injection molding device injects more plastic into the mold to cover the components and form the back half of frame 16 or temple 14A such that the FPCBs and electronics are embedded between the front and back halves of frame 16 and/or temple 14A. After forming the frame and both temples using the molding process, the temples are mechanically connected to the frame (e.g., with screws) to form the finished eyewear 12.

Wires, PCBs, and FPCBs throughout the eyewear accomplish the various electrical couplings between controller 100 and the other electronic components including the LED indicators. These electrical couplings are routed through various portions of frame 16 and/or temples 14A and 14B during the manufacturing (e.g., two-shot molding) process. Manufacturing of eyewear 12 fully embeds these electrical couplings in the eyewear such that they may or may not be visible to the user based on the opacity of the manufacturing material.

Figure 1C:
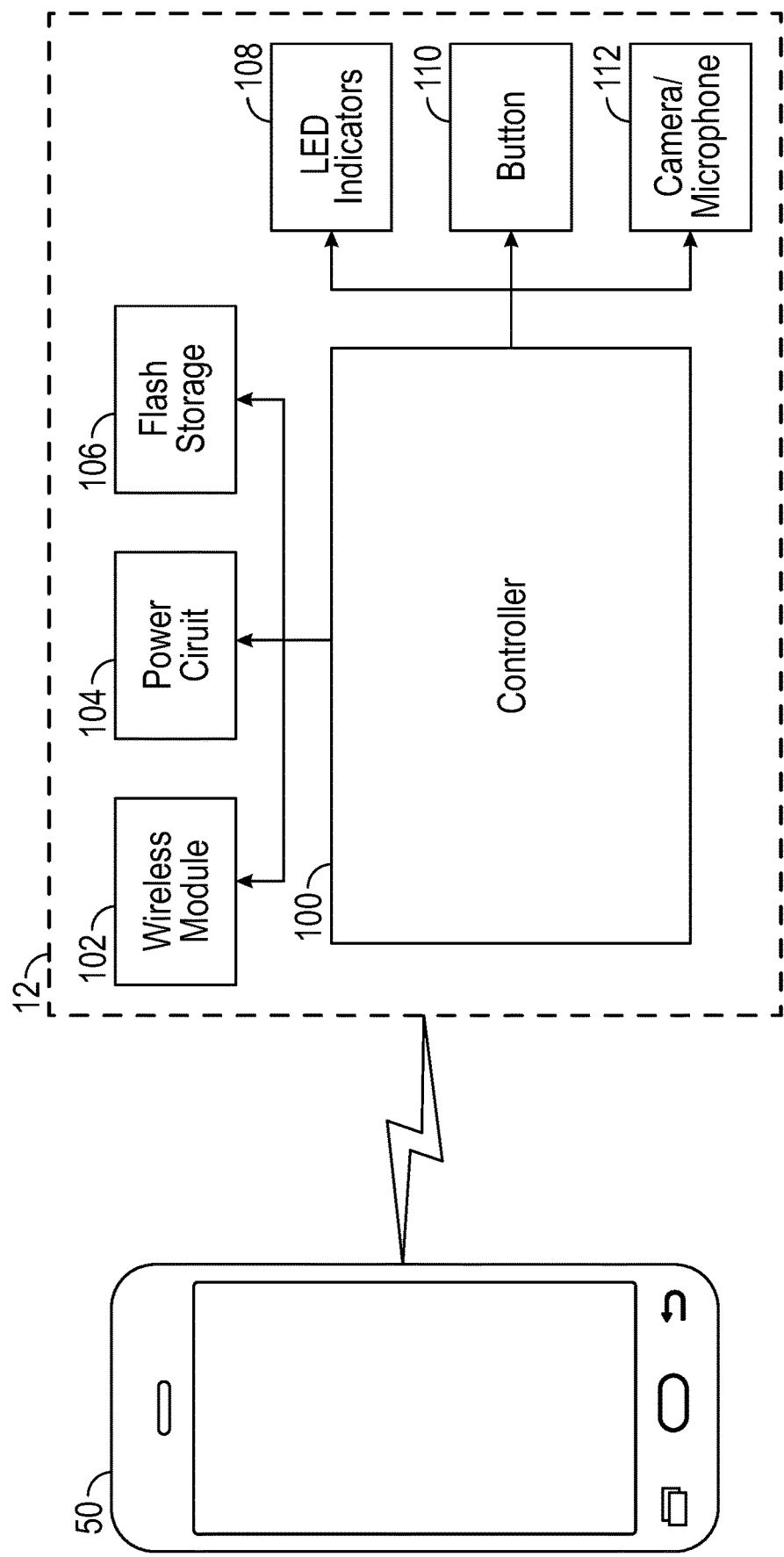
FIG. 1C is block diagram of the electronic components in the eyewear example of FIG. 1A.

FIG. 1C is a block diagram of example electronic components 20A and 20B coupled to LED indicators 108. The illustrated electronic components 20A and 20B include controller 100 (e.g., lower power processor, image processor, etc.) for controlling the various devices in eyewear 12; wireless module (e.g., Bluetooth™) 102 for facilitating communication between eyewear 12 and a client device (e.g., smartphone not shown); power circuit 104 (e.g., battery, filter, etc.) for powering eyewear 12; flash storage 106 for storing data (e.g., images, video, image processing software, etc.); LED indicators 108 (e.g., multicolored LEDs) for presenting information and aesthetic characteristics to the user and/or bystanders; button 110 (e.g., momentary push button) for triggering eyewear 12 to capture images/video; and camera/microphone 112 for capturing images/video and sound.

Wireless module 102 may couple with a client device 50 such as a smartphone, tablet, phablet, laptop computer, desktop computer, networked appliance, access point device, or any other such device capable of connecting with wireless module 102. Bluetooth, Bluetooth LE, Wi-Fi, Wi-Fi direct, a cellular modem, and a near field communication system, as well as multiple instances of any of these systems, for example, may implement these connections to enable communication there between. For example, communication between the devices may facilitate transfer of software updates, images, videos, lighting schemes, and/or sound between eyewear 12 and the client device (e.g., smartphone or other personal computing device uploading one or more lighting schemes to eyewear 12).

Camera/microphone 112 for capturing the images/video may include digital camera elements such as a charge-coupled device, a lens, or any other light capturing elements for capturing image data and converting into an electrical signal(s). Camera/microphone 112 may additionally or alternatively include a microphone having a transducer for converting sound into an electrical signal(s).

Button 110 may be a physical button that, when pressed, sends a user input signal to controller 100. Controller 100 may interpret pressing button 110 for a predetermined period of time (e.g., three seconds) as a request to turn on eyewear 12 (e.g., transition eyewear 12 from an off or sleep mode of operation to a low power mode of operation).

Controller 100 is a controller that controls the electronic components. For example, controller 100 includes circuitry to receive signals from camera 112 and process those signals into a format suitable for storage in memory 106. Controller 100 powers on and boots to operate in a normal operational mode, or to enter a sleep mode. In one example, controller 100 includes a microprocessor integrated circuit (IC) configured for processing sensor data from camera 112, along with volatile memory used by the microprocessor to operate. The memory may store software code for execution by controller 100.

Each of the electronic components require power to operate. Power circuit 104 may include a battery, power converter, and distribution circuitry (not shown). The battery may be a rechargeable battery such as lithium-ion or the like. Power converter and distribution circuitry may include electrical components for filtering and/or converting voltages for powering the various electronic components.

LED indicators 108, under control of controller 100 convey information to the user and/or to bystanders. For example, controller 100 may illuminate LED indicators 108 each time the user presses button 110 to indicate that eyewear 12 is recording images and/or video and/or sound.

Locations of LED indicators 108 may include the nose pad, frame, or temple of eyewear 12. Controller 100 of eyewear 12 may automatically control the operation of LED indicators 108. In one example, LED indicators 108 (positioned in the frame of eyewear 12) may be white LEDs that controller 100 controls to emit a "comet-like" pattern indicating (e.g., to bystanders) that the camera is active. In other examples, the lighting pattern may include different colors across the color spectrum, flashing or blinking patterns, and/or duration of illumination. Controller 100 or a personal computing device (e.g., smartphone) controls the lighting pattern of LED indicators 108 based on a lighting pattern selected by an application, a user, or a combination thereof. For example, if the user presses button 110 to capture a video, this may trigger the controller to illuminate the LED indicators 108 in a distinctive manner. Controller 100 may also control LED indicators 108 to illuminate according to a distinctive lighting pattern when capturing video. This functionality acts as an indicator to let bystanders know the camera is recording them, and provides the aesthetic characteristics desired by the user.

In another example, LED indicators 108 may be positioned on the inside of the frame of the eyewear to project light towards the user's eye. This information may indicate the status of eyewear functionality (e.g., that images are being recorded, eyewear is wirelessly communicating with another device, memory capacity, battery charge, etc.).

Wires, PCBs and FPCBs throughout the eyewear accomplish the various electrical couplings between controller 100 and the other electronic components including LEDs 108 shown in FIG. 1C. These electrical couplings route through various portions of frame 16 and/or temples 14A and 14B during the manufacturing (e.g., two-shot molding) process. The manufacturing process fully embeds the electrical couplings into eyewear 12 such that they may or may not be visible to the user based on the opacity of the manufacturing material.

Figure 2A:
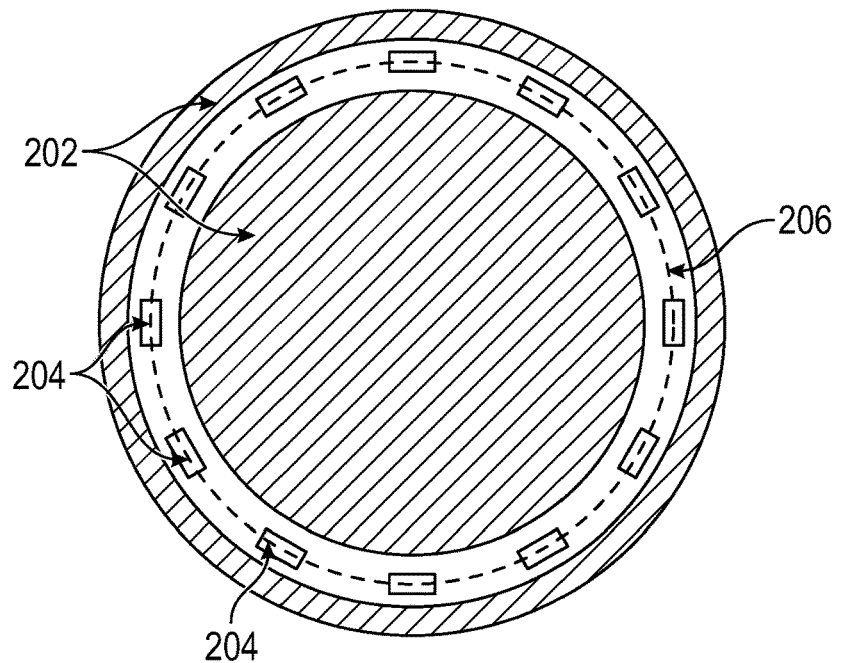
FIG. 2A is a front view of the LED indicator in FIG. 1A.

As described above, LED indicators 11 are located on the front of the eyewear frame to alert bystanders that the camera is active. FIG. 2A is a front view of LED indicator 11 in FIG. 1A. The outer circumference of indicator 11 includes a number (e.g., 15, 24, etc.) of LEDs 204 forming a radial (e.g., circular) pattern. LEDs 204 are physically mounted and electrically coupled to a circuit board (not shown) located behind indicator 11. Although FIG. 2A shows a specific example of LEDs located in a radial pattern, it is noted that the radius and number of LEDs in the radial pattern may be selected to achieve desired functionality/aesthetics of indicator 11.

In addition to LEDs 204, indicator 11 also includes a transmission mask 202. In one example, transmission mask 202 includes a light absorbing coating placed on a cover lens (not shown) located in front of LEDs 204. For example, transmission mask 202 may have a pattern (e.g., black light absorbing paint) that is located in areas of the cover lens where it is desirable to block the light from exiting the cover lens, and a transmission coating that is located above the LEDs where it is desirable to allow the LED generated light to exit the cover lens. The transmission properties of the transmission coating may allow for complete or partial transmission of light through the cover lens (e.g., 15% transmission which contributes to hiding the LEDs when they are off). In other cases, the transmission coating may have variable transmission to help reduce LED non-uniformities.

In order to achieve a desirable visual effect, indicator 11 (see FIG. 2B) also includes a light diffuser to diffuse light emitted from LEDs 222. In a first example, the position of the light diffuser is between LEDs 222 and LED window 226 (see light diffuser 225). In a second example, the position of the light diffuser is between LED window 226 and cover lens 228 (see light diffuser 227). In a third example, LED window 226 may be sandwiched between both light diffusers 225 and 227. In a fourth example, LED window 226 may itself be a light diffuser (e.g., an additive can be added to the clear LED window). In a fifth example, LED cover lens 228 may itself be a light diffuser (e.g., an additive can be added to the cover lens). Either of these configurations provide a desirable visual effect for observers and for the user by diffusing the light emitted from LEDs 222. Further details of the structure of indicator 11 are shown in FIGS. 2B, 2C and 2D.

Figure 2B:
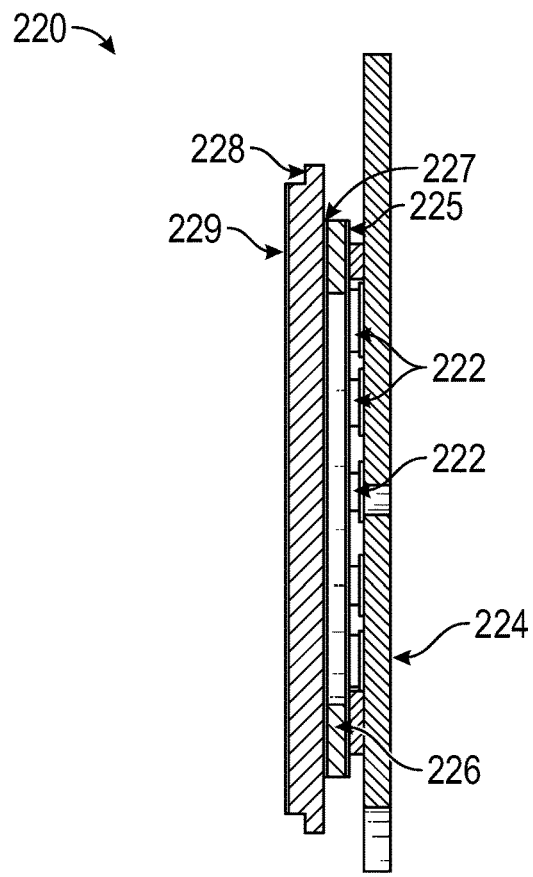
FIG. 2B is a side layer view of the LED indicator in FIG. 1A.

Specifically, FIG. 2B shows a side layer view 220 of the LED indicator in FIG. 1A. In this example, the indicator includes multiple layers. The layers include a PCB layer comprising PCB 224, an LED layer comprising LEDs 222, a window layer comprising LED window 226, a cover layer including cover lens 228, and a diffuser layer comprising diffuser(s) 225, 227 or a combination of the two. Alternatively, the window layer or the cover layer may have light diffusion capabilities. The structure of the indicator layers from the innermost layer (layer furthest towards the inside of frame 16) to the outermost layer (layer furthest towards the outside of frame 16) is set forth below. PCB 224 is located in a position towards the inside of eyewear frame 16. LEDs 222 physically mount to PCB 224 (e.g., in a radial pattern at a set radius 206) and are electrically coupled to electrical traces (not shown) on PCB 224. It is noted that PCB 224 is also connected to FPCBs (not shown) to connect indicator 11 to other electronic components (e.g., controller) internal to the eyewear. Positioned in front of LEDs 222 is LED window 226 (e.g., clear plastic). LED window 226 (e.g., which may have a radial shape) protects LEDs 222, while allowing the LEDs to freely emit light. Positioned in front and/or in back of LED window 226 is diffuser(s) 225 and/or 227 to diffuse the light emitted from LEDs 222. The diffusers may have a radial shape in order to cover the radially positioned LEDs. Positioned in front of LED window 226 and/or diffuser 227 is cover lens 228 for protecting the electronic components. Cover lens 228 is also coated with transmission mask 229 to allow and/or block light from exiting certain regions of the cover lens. As described above, the diffusers 225 and/or 227 may be replaced by adding diffusion capabilities (e.g., additives) to LED window 226 or cover lens 228.

Figure 2C:
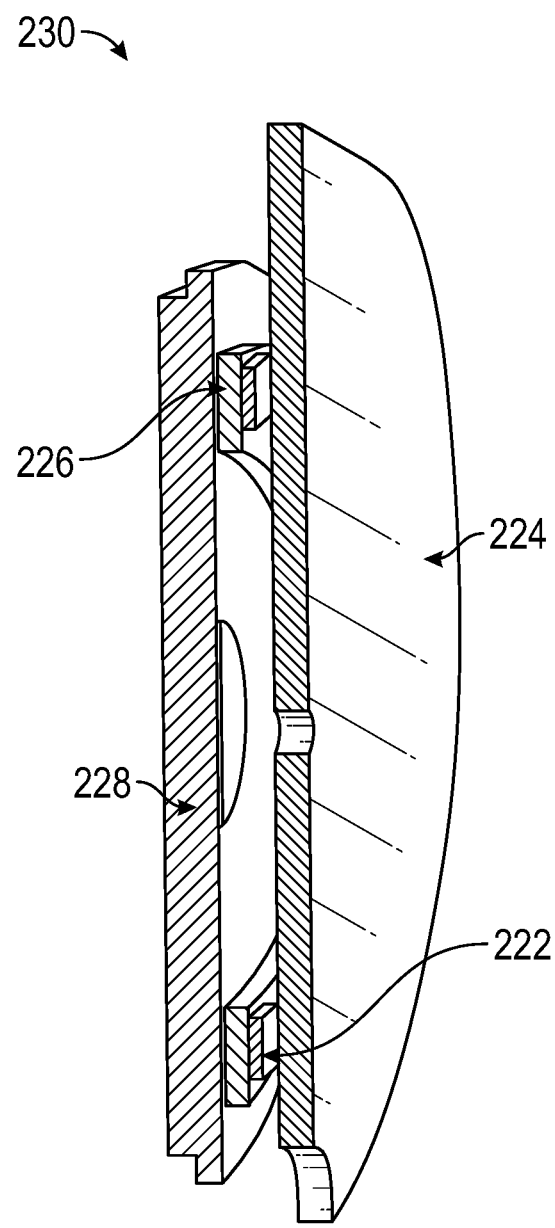
FIG. 2C is a perspective layer view of the LED indicator in FIG. 1A.
Figure 2D:
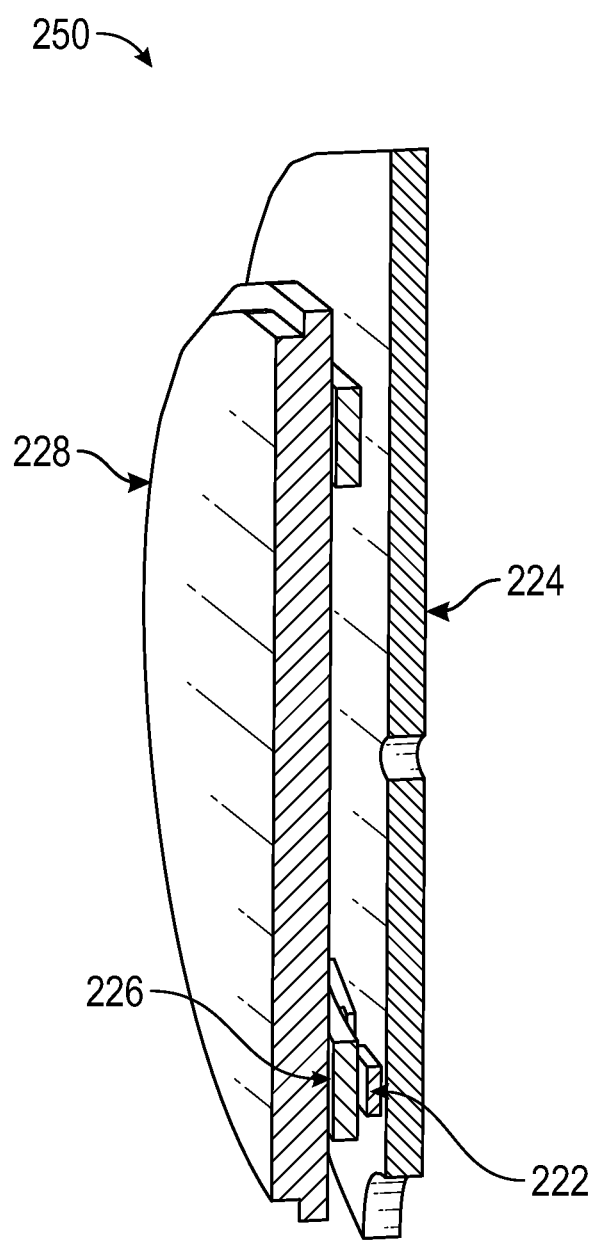
FIG. 2D is another perspective layer view of the LED indicator in FIG. 1A.

FIG. 2C is a cutaway perspective layer view 230 of the LED indicator 11 in FIG. 2A. As shown in FIG. 2C, PCB 224 and LED window 226 and cover lens 228 are cutaway. For clarity, diffusers 225/227 and transmission mask 229 are not shown. Yet another cutaway view 250 is shown in FIG. 2D (again, diffusers 225/227 and transmission mask 229 are not shown for clarity). Although diffusers 225/227 and transmission mask 229 are not shown in FIG. 2C or 2D, they may be included in the LED indicator as shown in FIG. 2B.

The optical properties of diffuser 225/227 diffuse the light emitted from LEDs 222 in a desired emission pattern. One example of an emission pattern may be a "comet-like" pattern. The performance of this comet-like pattern is shown in view 260 of FIG. 2E.

Figure 2E:
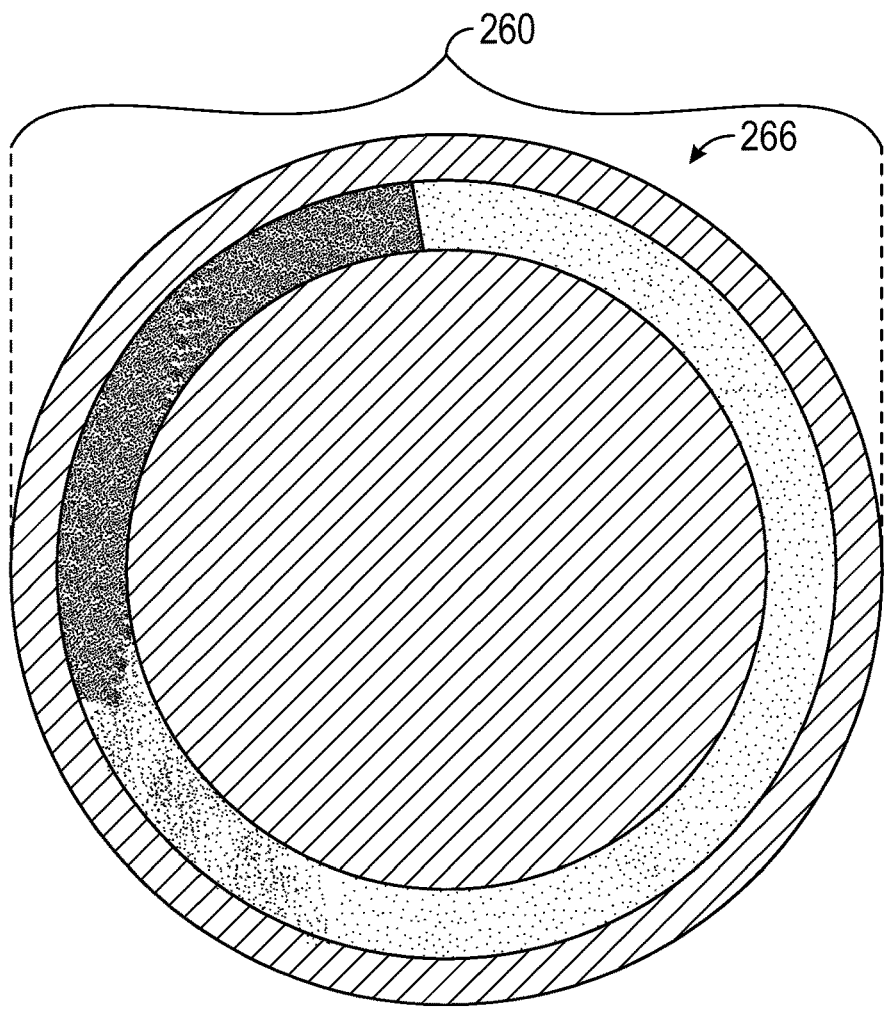
FIG. 2E is an example of an anisotropic diffuser for the LED indicator in FIG. 1A to produce a comet-like effect.

Indicator 266 in FIG. 2E is similar in structure to the indicators shown in FIGS. 2A-2D. For example, indicator 266 includes a PCB layer, LED layer, and a diffuser layer. The diffuser layer of indicator 266 transforms discrete light emitted from LEDs 222 into a comet-like pattern where a controller sequentially turns the LEDs (not shown) ON/OFF in a radial pattern (e.g., counterclockwise as shown). For example, discrete LEDs 222 shown in FIG. 2A may be controlled in the following manner. A select number of LEDS (e.g., 12) represent the length of the comet. The lead LED of the select LEDs is the brightest and represents the head of the comet. The remaining LEDs in the comet get dimmer as they reach the final LED which represents the tail of the "comet". This is illustrated in FIG. 2E, where the lead LED (e.g., LED at 12 o'clock) is the brightest, the middle LED (e.g., LED at 4 o'clock is medium bright), and the tail LED (e.g., LED at 9 o'clock) is the dimmest. The other LEDs (e.g., LEDs between 9 o'clock and 12 o'clock) that are not part of the "comet" and are not emitting (e.g., they are black). During operation in this example, the comet moves in a counterclockwise manner around the radius of the indicator by sequentially turning the LEDs ON/OFF at a predetermined brightness. The speed of orbit (how fast the comet travels around the indicator), the brightness, and the size of the comet are all controllable by the controller (e.g., the controller controls how many LEDs are illuminated, the brightness of the LEDs and the speed at which the LEDs are turned ON/OFF).

As is shown in FIG. 2E, the comet-like pattern is blended due to the diffuser such that the light from individual LEDs is not decipherable (i.e., the light from adjacent LEDs mixes together in a uniform manner). This visual effect is achieved by a light diffuser.

Figure 2F:
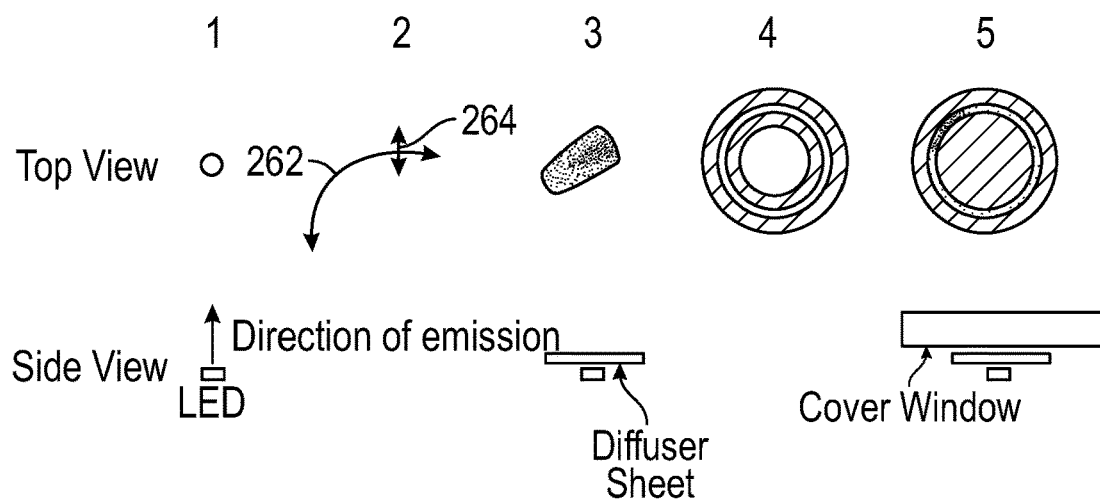
FIG. 2F is an example of steps for constructing the LED indicator in FIG. 1A to produce a comet-like effect.

FIG. 2F shows an example for constructing an LED indicator to produce the comet-like pattern. Step 1 shows the discrete emission of a single LED light source that may be included in the indicator. Step 2 shows the optical characteristics of an anisotropic diffuser where arrows 262 and 264 represent the diffusion pattern. Arrow 262 represents the diffusion pattern along the radial path, whereas arrow 264 represents the diffusion pattern along an axis that intersects the radial path. These arrows indicate that the diffuser spreads the light with brighter intensity on one side resulting in the comet-like pattern shown Step 3. This anisotropic diffusion pattern may be repeated around the radial path such that the intersection of arrow 264 and arrow 262 is located in front of each LED in the indicator (e.g., an intersection point is located at 12 o'clock, 1'oclock . . . 11 o'clock, as shown in FIG. 2A). Alternatively, the diffusion pattern may only be placed in front of select LEDs (e.g., intersections at 12 o'clock, 3 o'clock, 6 o'clock and 9 o'clock). As shown in Step 4, the transmission mask (e.g., transmission ring aligned with the LEDs) is added such that light from the LEDs exits the cover lens only at desired locations and is blocked from exiting the cover lens at other locations (e.g., the dark locations). A center region may also allow light to exit when a camera and/or sensor is included in the center of indicator 11. As shown in Step 5, as the LEDs are sequentially turned ON/OFF in a radial pattern (e.g., LED at 11 o'clock is ON while the rest of the LEDs are OFF), a comet-like pattern is achieved (e.g., a comet with a head having a sharp bright edge on one side and a tail that is less bright on the opposite side). A standard isotropic diffuser could not achieve this result, as the head of the comet would not have a sharp bright edge.

In addition to the anisotropic diffuser, indicator 11 may also include walls (not shown) between the respective LEDs to prevent light from bleeding from one LED section to another. This may help the comet have a more distinctive head.

The comet-like pattern shown in FIG. 2E is just one example of an emission pattern. Other emission patterns are possible using the anisotropic diffuser. For example, the diffuser could diffuse light along any axis (e.g., horizontal, vertical, diagonal) with respect to the eyewear structure. In addition, other diffusers (e.g., prism-like diffusers) could be utilized to redirect light. These prism-like diffusers could redirect a light cone emitted from the LEDs at a specific emission angle towards the observers or towards the user. This is illustrated in FIG. 3A, which shows a top view 300 of the eyewear example of FIG. 1A illustrating the output of such an indicator.

Figure 3A:
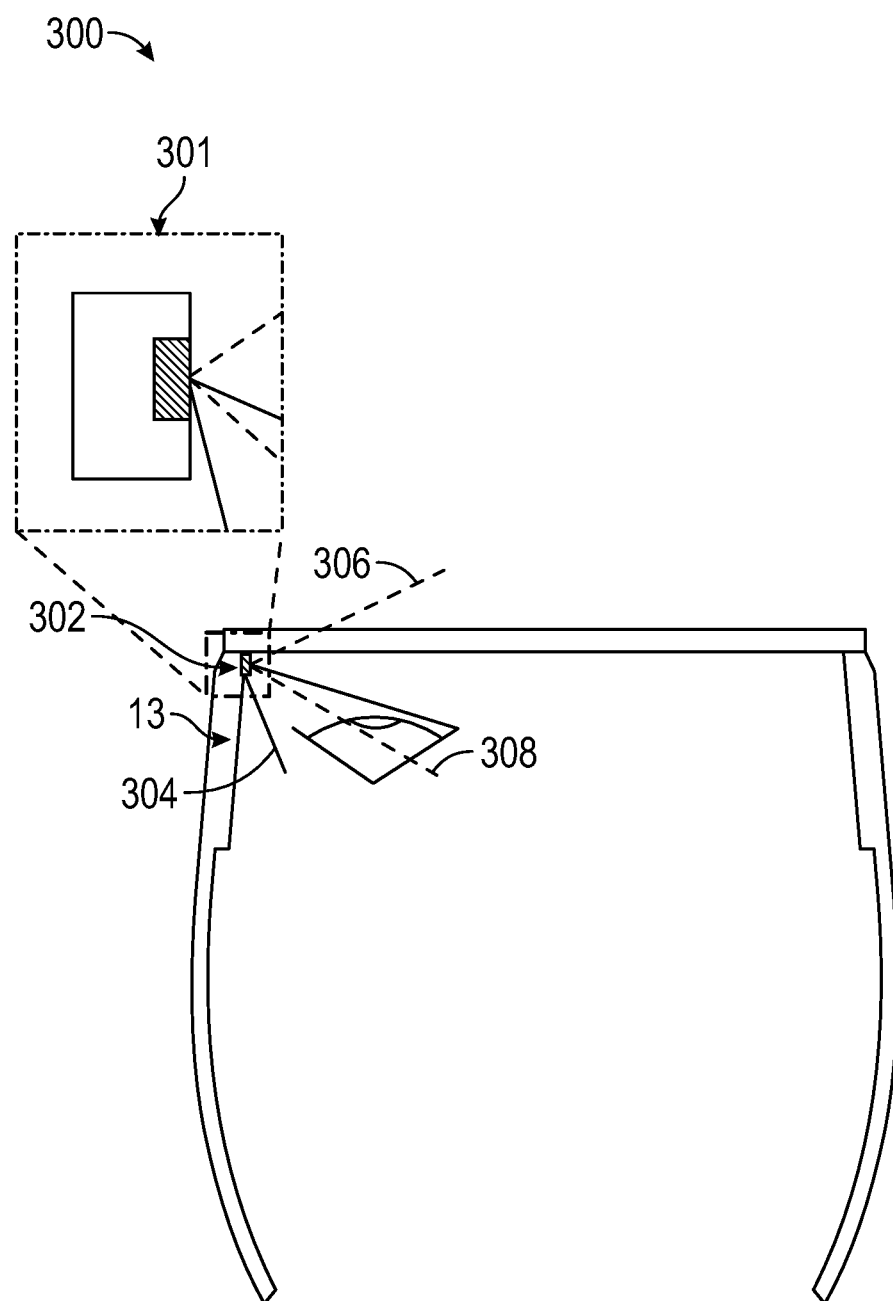
FIG. 3A is a top view of the eyewear example of FIG. 1A illustrating the output of an LED indicator directed towards the eye of the user.

As shown in FIG. 3A, indicator 302 may be positioned on the inner surface (e.g., frame 13) of the eyewear such that the LED(s) are directed towards the user's eye 308. This indicator may include one or more LEDs and a prism-like diffuser (not shown) to ensure that the emitted light pattern (i.e., the cone) is directed towards the user's eye 308. This is beneficial to ensuring that the user of the eyewear receives information from the indicator, while ensuring that observers in proximity to the user do not perceive the light. This information may include the status of certain eyewear functionality (e.g., recording status, memory status, processing status, transmission status, battery status, software status, etc.). The desired emission pattern produced by the prism-like diffuser in this example cone 304 shown by two solid lines which is more desirable than cone 306 which would be produced by the LED alone (i.e., cone 304 produced by the prism-like diffuser is directed (e.g., tilted) towards the user's eye 308, whereas cone 306 emits some light through the lenses of the eyewear which is perceived by observers). Block 301 shows a magnified view of cones 304 and 306 produced by the prism-like diffuser and the LED alone respectively.

Figure 3B:
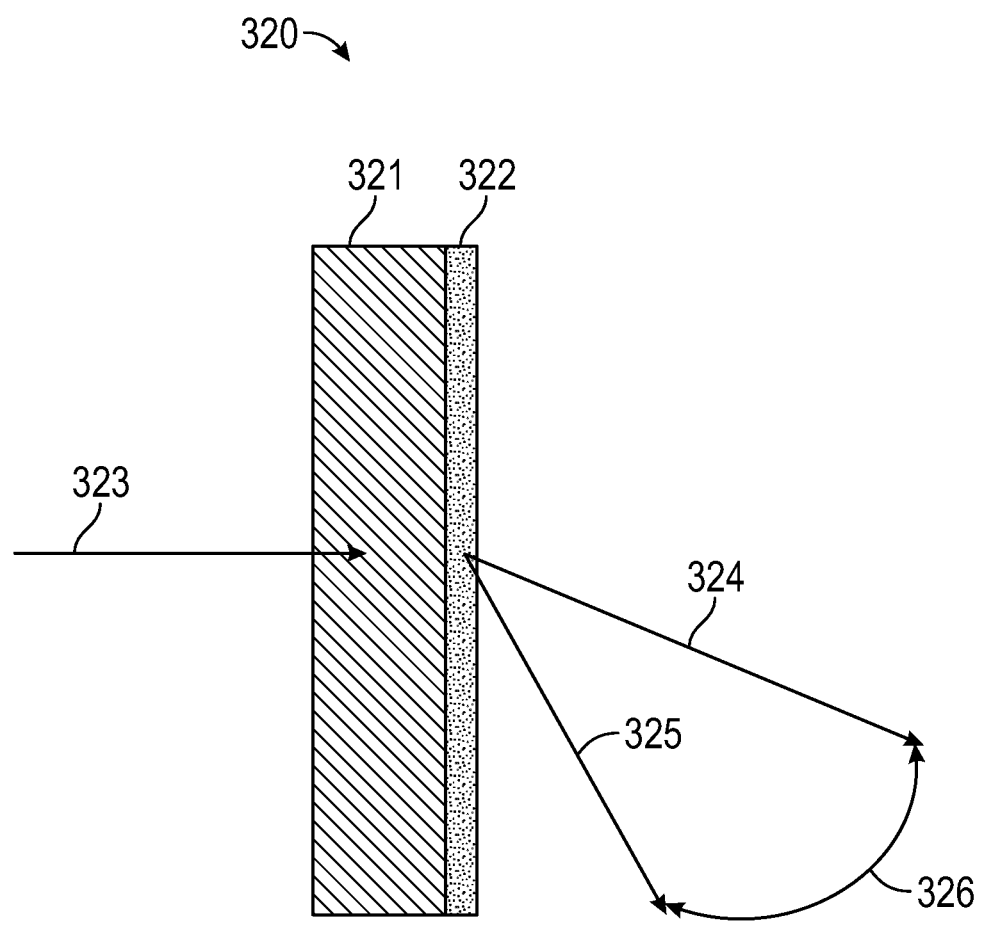
FIG. 3B is a side layer view of a prism-like diffuser for the LED indicator in FIG. 3A.

FIG. 3B is a side layer view 320 of a prism-like diffuser for the user indicator shown in FIG. 3A. As shown in FIG. 3B, the diffuser has two layers. A first layer 321 is the bulk of the diffuser material, while a second layer 322 is located on the diffuser surface. Second layer 322 is comprised of micro-structures that are strategically located on the surface of the diffuser to produce the desired diffusion pattern. In this example, the desired diffusion pattern is a cone of light that is directed (e.g., tilted) towards the user's eye as shown in FIG. 3A. The cone of light may have a specific emission angle range 326. For example, as light 323 emitted from the LEDs enters the diffuser, the light passes through layer 321 and into layer 322 where it diffuses according to the arrangement of the microstructures (e.g., light is bent). This produces a tilted light cone 326 defined by arrows 324 and 325 (i.e., light is emitted between these arrows). This light cone is tilted towards the eye of the user and ensures that the light is not perceivable to the casual observer.

FIGS. 2E and 3B show diffusion patterns for achieving a desired visual effect. Although FIGS. 2E and 3B show specific examples of a radial anisotropic diffuser and a prism-like diffuser respectively, the diffuser could be designed as an axial diffuser to produce emission patterns that have different diffusion characteristics along any axis (e.g., radial, horizontal, vertical, diagonal, etc.) relative to the eyewear, the user or the observer.

Figure 4A:
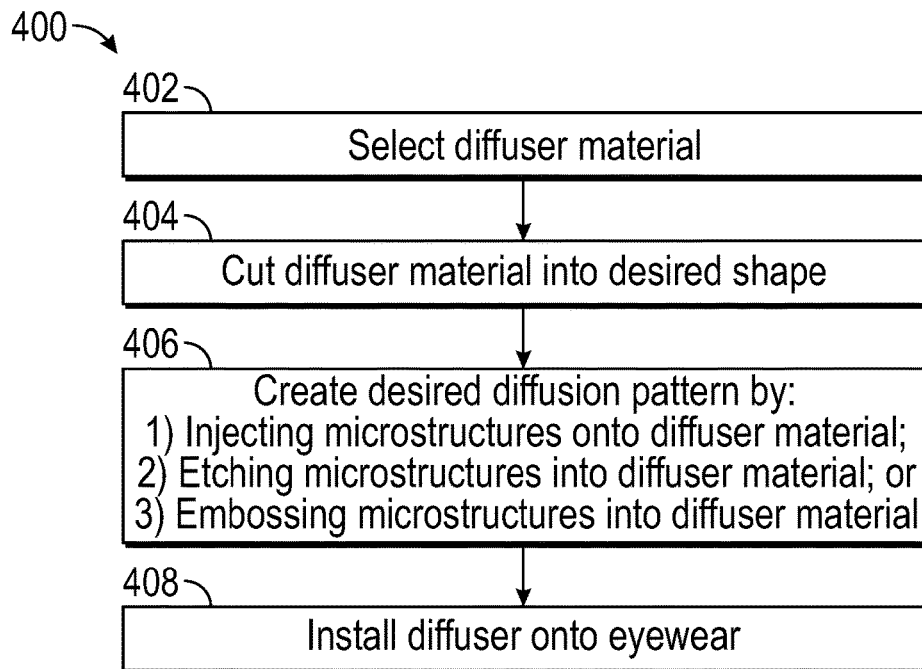
FIG. 4A is a flowchart showing an example of the manufacturing and installation of the diffuser into the eyewear.

FIG. 4A is a flowchart 400 showing an example of the manufacturing and installation of the diffuser (e.g., anisotropic, prism-like, axial, etc.). In step 402, the manufacturer or customer selects the diffuser material (e.g., polycarbonate sheet, etc.). The material is then cut into a desired shape (e.g., circular, rectangular, etc.) in step 404. The microstructure layer is then created on the diffuser surface in step 406. The microstructure layer may be created by strategically injecting microstructures onto the diffuser surface, etching microstructures onto the diffuser surface, embossing microstructures onto the diffuser surface, or any other equivalent process. For the creation of the microstructures, in addition to injecting, etching, embossing, they could also be created by molding, or replication from a master using a holographic process. In one example, the micro-structures could be micro-lenses that have non-axially symmetric profiles, or holographic patterns.

The size, shape, position and density of the microstructures has a direct effect on the diffusion properties of the diffuser. For example, more microstructures may be formed on the surface of the diffuser where light should be most attenuated, while fewer microstructures may be formed on the surface of the diffuser where light should be least attenuated. In another example, steps 404 and 406 could be reversed. For example, multiple diffusion patterns could be formed on the surface of a diffuser sheet, and then individually cut out for installation.

In step 408, the diffuser is installed into the eyewear. For example, if the diffuser is similar to the radial diffuser shown in FIG. 2E, the diffuser could be mounted to the front of the LEDs, and then molded into the frames of the eyewear along with the other electronic components. The diffuser could be the outermost external layer or could be protected by a clear plastic window. In either example, the diffuser diffuses the light emitted by the LEDs in the designed radial pattern.

Operation of the eyewear having both a radial indicator on the outer surface of the frames similar to FIG. 1A, and user indicator on the inner surface of the frames similar to FIG. 3A is described with reference to flowchart 450 in FIG. 4B. A trigger signal controls the LEDs in the radial indicator and the user indicator. A controller 100 automatically generates the trigger signal based on an application, or in response to user input (e.g., the user pressing a button 110 on the eyewear). For example, in step 452, the controller 100 determines if a trigger signal for illuminating the radial indicator is received (i.e., if the user pressed a button to turn ON the radial indicator). If the controller receives the trigger signal, the controller 100 turns on the radial LEDs 108 in step 454. Due to the diffuser having a radial anisotropic pattern, the light from the LEDs 108 diffuses in a radial manner.

If, however, the controller determines that the trigger signal is not for the radial indicator, the process proceeds to step 456, where the controller 100 determines if a trigger signal for illuminating the user indicator is received (i.e., if the user pressed a button to turn ON the user indicator). If the user indicator trigger signal is received, the controller 100 turns on the user indicator LEDs 108 in step 458. Due to the diffuser having prism-like pattern, the light from the LEDs is tilted accordingly.

Figure 4B:
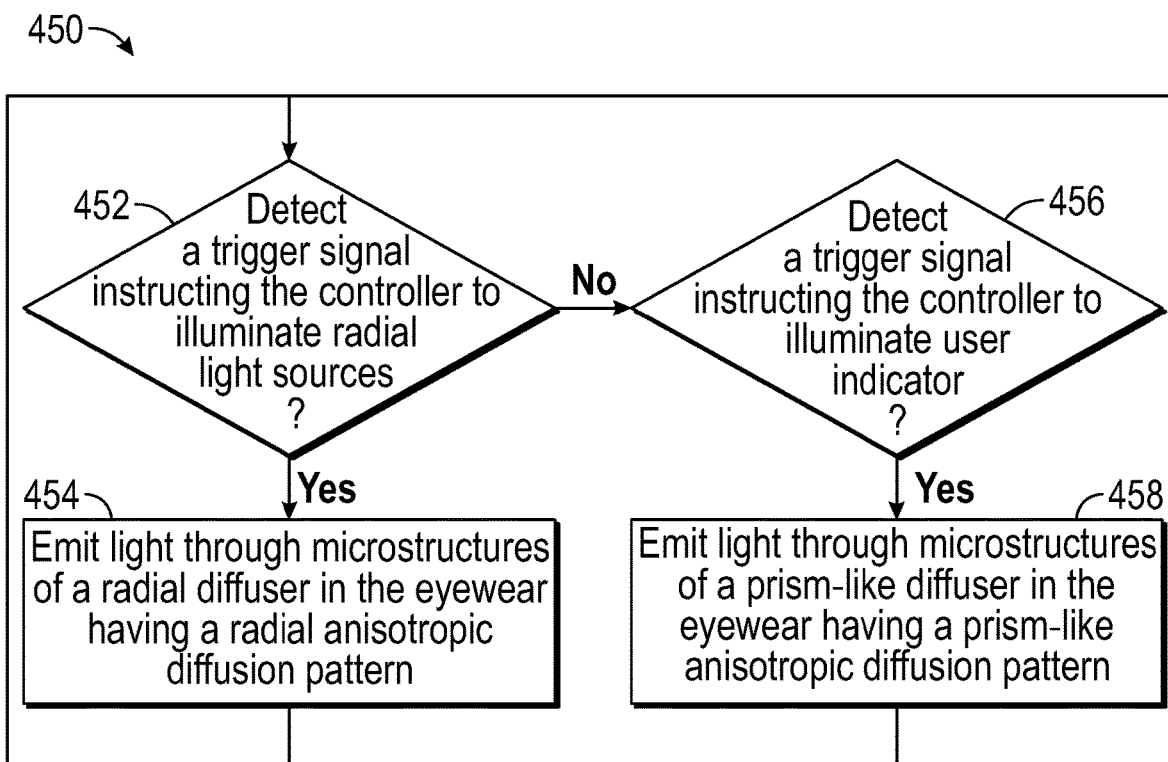
FIG. 4B is a flowchart showing an example of the operation of the eyewear with a radial diffuser and a prism-like diffuser.

The steps in FIGS. 4A and 4B may be performed by controller 100 of the electronic components upon loading and executing software code or instructions which are tangibly stored on a tangible computer readable medium 106, such as on a magnetic medium, e.g., a computer hard drive, an optical medium, e.g., an optical disc, solid-state memory, e.g., flash memory, or other storage media known in the art. Thus, any of the functionality performed by the controller described herein, such as the steps in FIGS. 4A and 4B, may be implemented in software code or instructions that are tangibly stored on a tangible computer readable medium. Upon loading and executing such software code or instructions by the controller, the controller may perform any of the functionality of the controller described herein, including the steps in FIGS. 4A and 4B described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. Eyewear comprising:
a support structure configured to be worn on a head of a user;
a light source supported by the support structure, the light source indicating at least one of that images are being recorded, that the eyewear is wirelessly communicating with another device, memory capacity of the eyewear, or battery charge of the eyewear; and
a light diffuser on a surface of the support structure facing the head of the user when worn, the light diffuser positioned to diffuse light emitted by the light source to provide a tilted light cone directed toward an eye of the user whereby substantially no light is emitted outside the tilted light cone.

2. The eyewear of claim 1, further comprising a window over the light source, wherein the light diffuser is positioned between the light source and the window.

3. The eyewear of claim 1, further comprising a cover lens and a window over the light source, wherein the light diffuser is positioned between the window and the cover lens.

4. The eyewear of claim 1, further comprising a second light diffuser on a surface of the support structure facing the head of the user when worn and a window over the light source, wherein the window is sandwiched between the light diffuser and the second light diffuser.

5. The eyewear of claim 1, wherein the light diffuser is incorporated into a window over the light source.

6. The eyewear of claim 1, wherein the light diffuser is incorporated into a cover lens over the light source.

7. The eyewear of claim 1, further comprising a second light source and a second light diffuser incorporated into an indicator on the support structure and facing away from the head of the user when worn, the indicator having a printed circuit board layer, a light source layer including the second light source, a window layer including a window over the second light source, a cover layer including a cover lens, and a diffuser layer including the second light diffuser.

8. The eyewear of claim 7, wherein the second light diffuser is incorporated into the window layer or the cover layer.

9. The eyewear of claim 7, wherein the cover lens is coated with a transmission mask that passes or blocks light from exiting certain regions of the cover lens.

10. The eyewear of claim 7, wherein the printed circuit board layer is located on a surface of the support structure and the second light source comprises a plurality of light emitting diodes physically mounted to the printed circuit board layer in a radial pattern at a set radius.

11. The eyewear of claim 10, wherein the second light diffuser is positioned in front of or behind the window and has a radial shape adapted to cover the radial pattern of light emitting diodes.

12. The eyewear of claim 10, further comprising a controller, wherein the second light diffuser diffuses light emitted by the second light source in a comet-like emission pattern where the controller sequentially turns on/off the plurality of light emitting diodes in the radial pattern.

13. The eyewear of claim 12, wherein a select number of the plurality of light emitting diodes represent a length of a comet, a first light emitting diode of the select number of light emitting diodes is brightest and represents a head of the comet and remaining light emitting diodes of the select number of light emitting diodes get dimmer as they approach a final light emitting diode of the select number of light emitting diodes.

14. The eyewear of claim 13, wherein the controller controls a speed of how fast the comet moves around the indicator, brightness of the light emitting diodes, and a size of the comet.

15. The eyewear of claim 14, wherein the second light diffuser provides an anisotropic diffusion pattern around the radial pattern of light emitting diodes.

16. The eyewear of claim 14, wherein the second light diffuser provides a diffusion pattern that is placed in front of select light emitting diodes in the radial pattern of light emitting diodes.

17. The eyewear of claim 1, wherein the light diffuser is anisotropic and diffuses light from the light source along an axis with respect to the support structure.

18. The eyewear of claim 1, wherein the light diffuser is a prism-like diffuser that redirects light from the light source as the tilted light cone at a specific emission angle towards the eye of the user.

19. The eyewear of claim 1, wherein the light diffuser comprises a first diffuser layer and a second diffuser layer adjacent the first diffuser layer, wherein the second diffuser layer comprises micro-structures that produce the tilted light cone.

20. The eyewear of claim 1, further comprising a controller, a second light source coupled to the controller and supported by the support structure, and a second light diffuser on a surface of the support structure, wherein the controller is configured to:
detect, in the support structure of the eyewear, a trigger signal instructing the controller to illuminate the light source in the support structure; and
detect, in the support structure of the eyewear, another trigger signal instructing the controller to illuminate the second light source in the support structure;
in response to receiving the trigger signal, illuminating, by the controller, the light source in the support structure such that the light source emits light through the diffuser in the eyewear in the tilted light cone; and in response to receiving the other trigger signal, illuminating, by the controller, the second light source in the support structure such that the second light source emits light through the second diffuser in the eyewear in a radial anisotropic diffusion pattern.

\* \* \* \* \*